(12) United States Patent
Lemaire et al.

(10) Patent No.: US 12,467,114 B2
(45) Date of Patent: Nov. 11, 2025

(54) DEVICE AND METHOD FOR HEAT TREATMENT OF STEELS, INCLUDING A WET COOLING

(71) Applicant: FIVES STEIN, Maisons-Alfort (FR)

(72) Inventors: Sébastien Lemaire, Maisons-Alfort (FR); Patrice Sedmak, Maisons-Alfort (FR)

(73) Assignee: FIVES STEIN (FR)

( * ) Notice: Subject to any disclaimer, the term of this patent is extended or adjusted under 35 U.S.C. 154(b) by 675 days.

(21) Appl. No.: 17/783,310

(22) PCT Filed: Dec. 7, 2020

(86) PCT No.: PCT/FR2020/052322
§ 371 (c)(1),
(2) Date: Jun. 8, 2022

(87) PCT Pub. No.: WO2021/116582
PCT Pub. Date: Jun. 17, 2021

(65) Prior Publication Data
US 2023/0014843 A1    Jan. 19, 2023

(30) Foreign Application Priority Data
Dec. 9, 2019 (FR) ....................................... 1913980

(51) Int. Cl.
*C21D 9/573* (2006.01)
*C21D 1/667* (2006.01)
(Continued)

(52) U.S. Cl.
CPC ............ *C21D 9/5735* (2013.01); *C21D 1/667* (2013.01); *C21D 1/74* (2013.01); *C23C 2/0038* (2022.08);
(Continued)

(58) Field of Classification Search
CPC ........ C21D 9/5735; C21D 1/667; C21D 1/74; C21D 1/25; C21D 1/26; C21D 1/42; C21D 1/60; C21D 1/613; C21D 1/76; C21D 8/0247; C21D 9/573; C21D 9/60; C21D 11/00; C21D 11/005; C23C 2/0038; C23C 2/022; C23C 2/0222; C23C 2/0224;
(Continued)

(56) References Cited

U.S. PATENT DOCUMENTS

| 4,561,911 A | * | 12/1985 | Tanikawa | ............... C21D 9/573 148/638 |
|---|---|---|---|---|
| 2016/0304984 A1 | | 10/2016 | Genaud | |
| 2020/0017934 A1 | * | 1/2020 | Magadoux | ............. C23G 3/028 |

FOREIGN PATENT DOCUMENTS

| CN | 105793446 A | 7/2016 |
|---|---|---|
| FR | 3014447 A1 | 6/2015 |

(Continued)

*Primary Examiner* — Adil A. Siddiqui
(74) *Attorney, Agent, or Firm* — The Belles Group, P.C.

(57) ABSTRACT

The invention relates to a method for removing residues present on a metal strip at the outlet of a cooling stage of a continuous line, the residues being formed during a cooling of said metal strip by a non-oxidizing liquid solution for the metal strip and a stripping liquid solution for the oxides present on the surface of the strip, or by a mixture of this liquid solution and a gas. The method according to the invention is characterized in that it comprises a step of reducing the residues by hydrogen.

7 Claims, 6 Drawing Sheets

(51) Int. Cl.
  *C21D 1/74* (2006.01)
  *C23C 2/00* (2006.01)
  *C23C 2/02* (2006.01)
  *C23C 2/40* (2006.01)
  *C23G 1/08* (2006.01)

(52) U.S. Cl.
  CPC ............ *C23C 2/022* (2022.08); *C23C 2/0222* (2022.08); *C23C 2/0224* (2022.08); *C23C 2/024* (2022.08); *C23C 2/40* (2013.01); *C23G 1/08* (2013.01)

(58) Field of Classification Search
  CPC ....... C23C 2/024; C23C 2/40; C23C 2/00344; C23C 2/06; C23G 1/08; C23G 5/04; C23G 5/00; Y02P 10/25
  See application file for complete search history.

(56) References Cited

FOREIGN PATENT DOCUMENTS

FR  3064279 A1  9/2018
WO  WO-2018172713 A1 *  9/2018  ............... C21D 1/56

\* cited by examiner

DEVICE AND METHOD FOR HEAT TREATMENT OF STEELS, INCLUDING A WET COOLING

CROSS-REFERENCE TO RELATED PATENT APPLICATIONS

The present application is a U.S. national stage application under 35 U.S.C. § 371 of PCT Application No. PCT/FR2020/052322 filed Dec. 7, 2020, which claims priority to French Patent Application No. 1913980 filed Dec. 9, 2019. The disclosures of the aforementioned priority applications are incorporated herein by reference in their entireties.

DESIGNATION OF THE RELEVANT TECHNICAL FIELD

The invention relates to annealing lines and hot-dip galvanization lines for flat products, and more particularly to continuous lines equipped with a non-oxidizing and stripping liquid cooling stage. It is related to the field of metallurgy and addresses both the heat treatment and the chemistry of steels.

TECHNICAL PROBLEMS ADDRESSED BY THE INVENTION

Lines equipped with gas cooling do not cover all high-strength steels due to an insufficient cooling slope. Indeed, gas cooling, which is typically carried out by blowing a mixture of nitrogen and hydrogen at high speed on the product, makes it possible to reach cooling speeds of up to 200° C./s for steel strips 1 mm thick. This is insufficient compared to the slopes targeted to obtain the desired metallurgical structure of the latest generation high-strength steels, in particular martensitic steels, which typically require cooling rates between 500° C./s and 1000° C./s, even 2000° C./s, for steel strips 1 mm thick.

To obtain a sufficient cooling slope for the thermal cycles of the latest generation steels, it is necessary to go through a liquid quenching step by spraying a liquid, or a mixture of a liquid and a gas, for example nitrogen or a mixture of nitrogen and hydrogen, on the strip. The flow rates and pressures to be implemented in the cooling stage depend on the nature of the steels to be treated and the cooling slopes to be respected. The temperature of the strip at the outlet of the cooling stage is typically between 50° C. and 500° C.

However, water cooling generates a surface oxidation that is often incompatible with the subsequent coating when it is found in large quantities. This oxidation takes the form of FeO, $Fe_2O_3$, and $Fe_3O_4$ for a product temperature above 575° C., and it takes the form of $Fe_2O_3$ and $Fe_3O_4$ for a product temperature below 575° C. It is therefore necessary to establish an intermediate chemical stripping stage between the cooling and the coating. This chemical stripping stage is expensive in terms of investment and operation and it increases the footprint of the installation.

FR3014447 and FR3064279 by the applicant describe liquid quenching methods in which the cooling liquid is non-oxidizing for the strip and is stripping with regard to the oxides present on the surface of the strip, in particular those formed from addition elements contained in the steel to be treated. This liquid is, for example, composed of a mixture of demineralized water and formic acid. It can be sprayed onto the strip by means of nozzles, alone or with a gas, for example nitrogen or a mixture of nitrogen and hydrogen. These methods have proven their effectiveness in avoiding or reducing the presence of oxides on the surface of the product, by limiting their formation and/or by directly stripping those that may have formed on the surface of the strip. Establishing an intermediate stripping stage is thus no longer necessary.

However, the applicant has observed that using a non-oxidizing and stripping cooling liquid leads to residue formation, for example formate salts or iron hydroxides, which remain present on the strip. On an annealing line, these residues give a color to the strip at the line outlet. They are likely to pose problems for the subsequent use of the sheet, in particular for the phosphating treatment for products intended for the automotive market. Phosphating is the first step in a painting process. The sheet metal is subjected to this treatment so that the layers of paint subsequently applied adhere correctly and over a long period of time. If the phosphating has defects, there is a risk of subsequent peeling/chipping/corrosion during use of the vehicle. To have good phosphating, the sheet must be perfectly clean, without pollution of any kind. On a hot-dip galvanization line, these residues can cause coating adhesion faults and make the coating incompatible with the level of quality sought, in particular in accordance with the requirements of sheet metal for the automotive industry. These residues of the non-oxidizing and stripping coolant must therefore be removed so that the surface quality of the strip at the line outlet meets customer expectations.

Furthermore, the addition elements present in the new generations of steel oxidize very easily compared to iron, and easily pollute the surface of the product, making it incompatible with galvanization because they prevent good adhesion of the coating. The presence of $MnO_x$, $SiO_x$, $BO_X$, $Mn_2SiO_4$, $MnAl_2O_4$ and $MnB_2O_4$ can thus be found on the surface of the product even when the atmosphere of the furnace has a very low dew point, for example at −40° C. Unlike iron oxide, these oxides are not reduced under the atmosphere present in the furnace. This is composed of a mixture of nitrogen and hydrogen, typically with 4% hydrogen. The addition of a pre-oxidation during the heating phase makes it possible to limit the presence of these oxides on the surface of the strip. This pre-oxidation is, for example, carried out in a direct firing furnace (DFF) through burners operating in excess air. It can also be carried out in a radiant tube furnace (RTF), for example in a dedicated chamber with an oxidizing atmosphere composed of a mixture of $N_2$ and $O_2$ or of $N_2$ and $H_2O$, or by another oxidizing atmosphere. During this pre-oxidation, an iron oxide barrier forms on the surface preventing the migration of addition elements to the surface; oxygen diffuses into the matrix and oxidizes these elements, thus blocking them in the steel. The iron oxide is then reduced in the downstream stages of the furnace, under a reducing atmosphere. Only the oxides of the addition elements initially present on the surface, and a limited part of those that have been able to migrate toward the surface, are thus present on the surface of the product.

For some steel grades, it is advantageous to carry out internal selective oxidation in a preheating or heating stage. It differs from pre-oxidation in that it only targets addition elements. It is obtained by combining, at depth, oxygen atoms from the surface with certain atoms of addition elements, leading to oxide precipitate formation. The internal selective oxidation is generally carried out in a dedicated chamber that is sufficiently oxidizing to oxidize the addition elements, but not the iron.

This pre-oxidation, or this internal selective oxidation, associated with water cooling is not of great interest, since although it limits the formation of surface oxides from the addition elements during heating, the liquid cooling with water that will follow will generate iron oxides on the surface that are incompatible with the dip galvanization method. In this case, a chemical stripping stage should be added before the coating.

In summary, the combination of a pre-oxidation of the product, or an internal selective oxidation, and a non-oxidizing and stripping wet cooling makes it possible to avoid the main drawbacks mentioned above. However, it can lead to residue formation on the surface of the product and cause a lower surface quality, for example adhesion defects of a subsequent coating. The invention makes it possible to treat/remove these residues.

TECHNICAL BACKGROUND

The applicant is not aware of a solution according to the state of the art that addresses the elimination of these residues, in particular because the cooling of the strip by a non-oxidizing and stripping liquid is not yet used on industrial production lines.

After cooling, steel grades require overaging. Its role is to subject the steel to aging in order to bring it from a state of metallurgical imbalance at the cooling outlet to a state of equilibrium. It is obtained by keeping the strip at a given temperature for a sufficient time. The overaging temperature, generally between 300° C. and 600° C. depending on the steel grade, is an important process parameter to be observed. Dwell time at overaging temperature is typically between 15 seconds and 90 seconds, depending on the steel grade.

After cooling, it is advisable not to exceed a temperature, beyond the overaging temperature, that would cause an undesired metallurgical transformation of the steel, which would risk canceling the metallurgical effects of quenching and degrading the mechanical properties of the strip. An overaging chamber can comprise means for heating the strip to bring it to the overaging temperature. As a variant, this heating means can be placed upstream of the overaging chamber. This heating means can be an inductor to quickly bring the strip to the required temperature. The overaging chamber also comprises radiant heating elements (candles, radiant tubes or electric strips) that maintain the temperature of the strip. An overaging chamber is maintained under a hydrogen atmosphere composed of a mixture of nitrogen and hydrogen traditionally comprising about 4% hydrogen by volume. This hydrogen content is not sufficient to reduce the residues present on the strip at the usual overaging temperatures.

In an annealing line, on leaving the overaging stage, the strip is cooled down to ambient temperature. In a galvanizing line, on leaving the overaging stage, the strip can be heated or cooled to bring it to a coating temperature, depending on whether the overaging temperature is lower or higher than the coating temperature. This can be done by dipping, that is to say, by immersing the strip in a bath containing the metal, or the metal alloy, constituting the coating to be applied to the strip, or by any other means. The coating may be zinc, an alloy containing zinc, or of any other nature. For dip coating, the coating temperature is close to the temperature of the liquid metal bath in which it is immersed.

SUMMARY OF THE INVENTION

According to a first aspect of the invention, there is proposed a method for removing residues present on a metal strip at the outlet of a cooling stage of a continuous line, the residues being formed during a cooling of said metal strip by a non-oxidizing liquid solution for the metal strip and a stripping liquid solution for the oxides present on the surface of the strip, or by a mixture of this liquid solution and a gas. The suppression method is characterized in that it comprises a step of reducing the residues with hydrogen.

By reduction step, the present invention relates to a reduction step of a redox reaction between an oxidizing agent and a reducing agent.

The residue reduction step can last between 15 seconds and 300 seconds for a strip temperature between 50° C. and 600° C.

The residue reduction step can be carried out under the hydrogen content present in the atmosphere of the furnace, that is to say, without increasing it. Thus, for example, the hydrogen content can remain at 4%, a content often used on existing lines. To obtain an effective reduction of the residues, it is then necessary either to lengthen the residue reduction step, or to increase the temperature of the strip during this step, or a combination of both, compared to a reduction of the oxides that would be done under a higher hydrogen content.

Advantageously, the residue reduction step is carried out while the metal strip is in an atmosphere whose hydrogen content is between 5% and 100%, and preferably greater than or equal to 10% by volume.

For the residue reduction step, hydrogen, or a hydrogenated atmosphere whose hydrogen content is between 5% and 100%, and preferably greater than or equal to 10% by volume, can be blown onto the metal strip.

The hydrogen, or hydrogenated atmosphere, blown onto the metal strip can have a temperature of between 500° C. and 800° C. This high temperature of the blown gas allows a greater efficiency of the residue reduction step compared to that obtained by blowing the hydrogen, or the hydrogenated atmosphere, at a lower temperature. The duration of the reduction step, and/or the temperature of the strip during the latter, can thus be reduced.

According to one possibility, the blowing speed of the hydrogen, or of the hydrogenated atmosphere, is between 10 m/s and 160 m/s in contact with the metal strip.

The residue removal method according to the first aspect of the invention may further comprise a step of pre-oxidation, or internal selective oxidation, of the surface of the strip carried out in a preheating, heating or holding at temperature step of the metal strip, arranged before the cooling stage.

The method for removing residues according to the first aspect of the invention can be implemented on a continuous line comprising a stage for dip coating the metal strip in a molten bath, and can further comprise, after the residue reduction step, a step of heating or cooling the metal strip to a temperature dose to the temperature of the bath.

The hydrogenated atmosphere is for example composed of a mixture of nitrogen and hydrogen.

According to a second aspect of the invention, proposed is the use of a continuous treatment line for a metal strip comprising a step of cooling said metal strip by a non-oxidizing liquid solution for the metal strip and a stripping liquid solution for the oxides present on the surface of the strip, or by a mixture of this liquid solution and a gas, characterized in that it further comprises a step of reducing the residues by hydrogen, said residues being formed during said cooling step.

According to a third aspect of the invention, proposed is a continuous treatment line for a metal strip comprising a coding stage for the metal strip by a non-oxidizing liquid solution for the metal strip and a stripping liquid solution for the oxides present on the surface of the metal strip, or by a mixture of this liquid solution and a gas, characterized in that it further comprises, downstream of the said coding stage in the direction of travel of the strip, a stage for reducing residues formed during coding and present on the strip, said reduction stage being designed to implement a removal method according to the first aspect of the invention, or one or more of its improvements.

The reduction stage may comprise means for reducing residues by hydrogen comprising means for blowing hydrogen, or a hydrogenated atmosphere, onto the metal strip to expose the metal strip to an atmosphere whose hydrogen content is between 5% and 100% by volume, and at a temperature between 500° C. and 600° C.

The residue reduction stage may comprise, at the inlet in the direction of travel of the strip, a rapid heating device to bring the strip to a temperature close to or equal to a predetermined temperature at which chemical reactions for the reduction of residues are triggered.

This rapid heating device is necessary when the power of the strip heating means present in this stage does not make it possible to reach this temperature quickly. Indeed, if the power density of the heating means is low, the time needed to reach the temperature necessary for the reduction step will have to be added to the dwell time of the strip in the stage. On a new line, this would lead to extending the length of the stage, and on an existing line, this would lead to a reduction in the speed of the strip.

The rapid heating means also makes it possible to limit the time during which the strip is brought to a temperature higher than that required to obtain the targeted metallurgy, thus limiting the undesired metallurgical transformations.

According to one possibility, the residue reduction stage is part of an averaging stage.

The residue reduction stage may comprise a means for blowing hydrogen, or a hydrogenated atmosphere, onto the metal strip.

According to one embodiment, the line according to the third aspect of the invention may further comprise a chamber for pre-oxidation, or internal selective oxidation, of the surface of the strip arranged in a preheating stage, a heating stage or a stage for maintaining the temperature of the metal strip, said stage being placed upstream of the cooling stage in the direction of travel of the strip.

According to another aspect of the invention, proposed is a computer program product comprising instructions that lead a line according to the third aspect of the invention, or one or more of its improvements, to execute the steps of the method according to the first aspect of the invention, or one or more of its improvements.

Advantageously, the residue reduction step is carried out while the strip is in an atmosphere whose hydrogen content is greater than or equal to 6%, advantageously greater than or equal to 7%, advantageously greater than or equal to 8%, advantageously greater than or equal to 9%, advantageously greater than or equal to 10% by volume.

According to one embodiment of the invention, the thermal and metallurgical cycle of the strip may comprise one or more of the following steps:

Preheating and pre-oxidation of the strip carried out in a direct flame furnace (DFF), the pre-oxidation being intended to form a layer of iron oxide on the surface of the strip and thus to limit the quantity of iron oxide addition elements present on the surface of the strip upstream of the cooling.

Heating and holding at temperature in two radiant tube furnaces (RTF), under a reducing atmosphere of nitrogen and hydrogen, to obtain the desired metallurgy before cooling, in particular the targeted proportion of austenite. During this heating and holding, the iron oxides present on the strip surface are gradually reduced by the hydrogen. As long as the iron oxide layer is not completely reduced, it prevents the migration of addition elements toward the surface of the strip. It is therefore advantageous for the layer of iron oxides to be completely removed only at the end of the hold, before the start of the cooling. If iron oxides remain at the end of the hold, they will be stripped during cooling. Their presence at the end of the hold is, however, not desired because the stripping products would pollute the solution sprayed for cooling. It would therefore be necessary to renew it more often, resulting in increased consumption of acid and demineralized water. The oxides formed from the addition elements are not reduced in the RTF.

Quenching with a non-oxidizing and stripping fluid in a cooling stage in order to obtain the desired metallurgy, in particular the transformation of part of the austenite into martensite. This non-oxidizing hardening strips the surface of the oxides that could be detrimental to the quality of the galvanization but leaves residues on the strip.

Reheating of the strip to a temperature close to the temperature at which the reduction reactions of the residues present on the strip start in an induction heating stage.

At the inlet of the overaging stage, a blowing of hydrogen, or a hydrogenated atmosphere, on the strip to bring its temperature to the temperature necessary to trigger the residue reduction reactions.

Cooling of the strip to the overaging temperature.

Holding at the overaging temperature to freeze the metallurgical structure, during which the surface of the strip is cleaned (residues formed during quenching and present on the surface of the strip after quenching are eliminated).

For an annealing line, the thermal cycle then comprises cooling the strip down to ambient temperature.

For a hot-dip galvanization line, the thermal cycle then comprises:

Heating or cooling the strip to coating temperature in an induction heating stage or a gas cooling stage, Coating of the strip by hot immersion in a zinc bath.

Final strip cooling in a cooling tower.

Examples of reactions between hydrogen and the residues implemented according to the method of the invention are given below, for the case of manganese:

(HCOO)$_2$Mn+H$_2$→CO+CO$_2$+H$_2$O+Mn
(HCOO)$_2$Mn+H$_2$→2HCOOH+Mn
HCOOH+H$_2$→H$_2$CO+H$_2$O (formaldehyde)
H$_2$CO+H$_2$→CH$_3$OH (methanol)

Similar reactions occur for iron and other addition elements.

The efficiency of the reaction is conditioned in particular by the film temperature at the surface of the strip, the hydrogen content, the dew point of the atmosphere, the contact time between the reactants, and the flow rate of the hydrogen, or the hydrogenated atmosphere, on the surface of the strip.

To simplify the description of the invention, we will consider hereinafter that the elimination of the residues is carried out in an overaging stage. It can also be performed in a stage dedicated to this function, especially if the line does not include an overaging stage.

Figure 3:
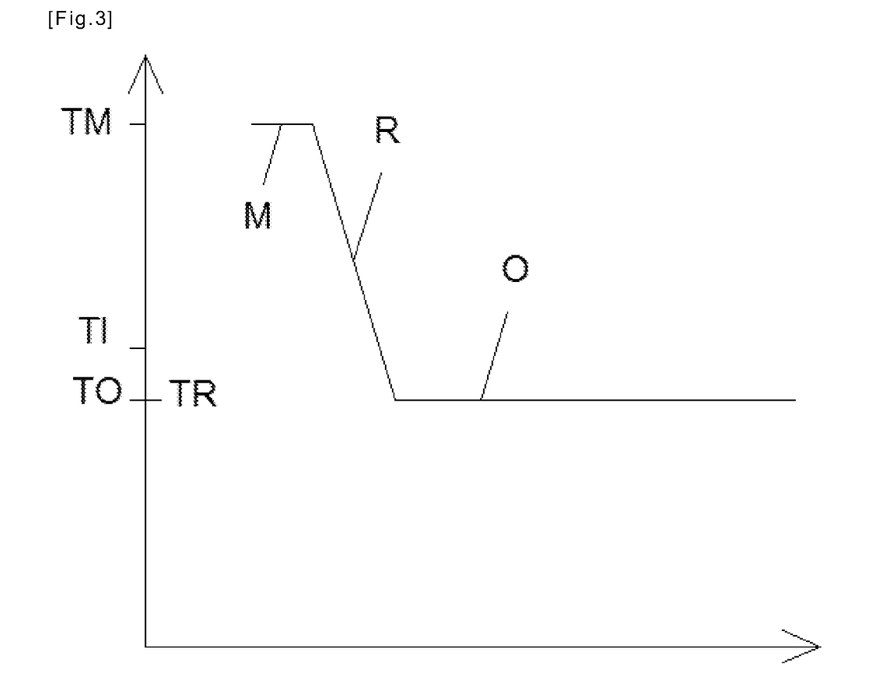
FIG. 3 is a diagram illustrating the temperature of the strip as a function of time in according to a first embodiment of the method according to the invention.
Figure 4:
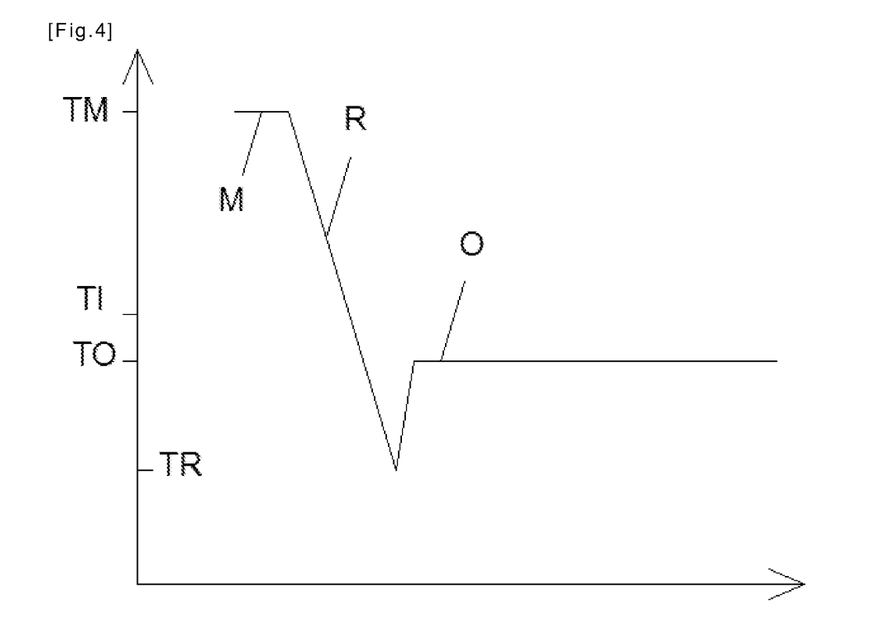
FIG. 4 is a diagram illustrating the temperature of the strip as a function of time according to a second embodiment of the method according to the invention.

According to one embodiment of the invention on a line comprising a large overaging stage, and/or when the overaging is carried out at a high temperature, the method according to the invention is implemented in this overaging stage by placing it under a hydrogen-enriched atmosphere. This atmosphere has a hydrogen content by volume of between 5% and 100%, depending on the dwell time and the temperature of the strip in the overaging stage. Preferably, the hydrogen content is greater than or equal to 10%. The entire overaging stage can be held at this higher hydrogen concentration or only part of it can be, depending on the strip dwell time required at this higher concentration for the removal of residues. In this configuration, it is not necessary to provide any particular hydrogen injection device other than those usually present on this stage. This solution is possible when the overaging temperature is sufficient to trigger the chemical reactions for reducing the residues and the dwell time in the stage is sufficient to have the time necessary for residue elimination. This embodiment of the invention is thus limited to lines comprising a large overaging stage and/or to steel grades allowing a high overaging temperature. It applies equally when the temperature at the end of cooling is equal to the overaging temperature, as shown in FIG. 3, or when the latter is lower than the overaging temperature, as shown in FIG. 4. When it is lower, the strip is first brought to the overaging temperature, for example by induction heating.

According to another embodiment of the invention, in the event the overaging temperature is not sufficient to trigger the chemical reactions for reducing the residues, the strip, or the film on the surface of the strip, is brought to a temperature sufficient to trigger the chemical reactions before bringing it, or bringing it back, to the overaging temperature. Advantageously, the strip is brought to a temperature sufficient to trigger the chemical reactions at the inlet of the overaging stage. This higher temperature and the possible dwell time at this temperature are limited to those necessary to trigger the in chemical reactions so as not to influence the metallurgy and the mechanical properties of the strip. As for the previous embodiment, the hydrogen content is increased in the overaging stage to favor the residue reduction.

Figure 5:
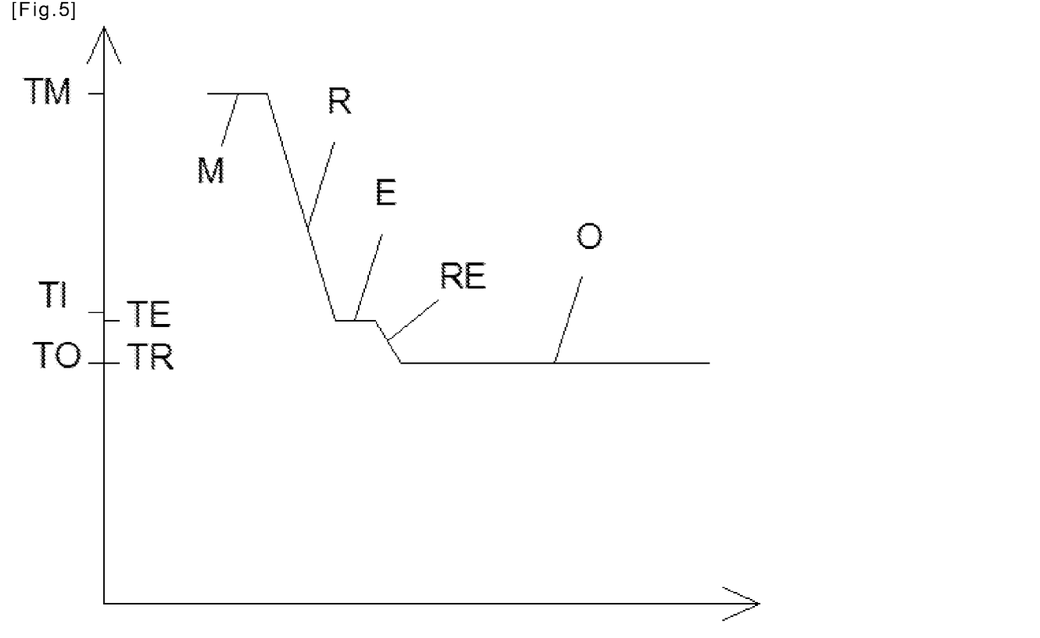
FIG. 5 is a diagram illustrating the temperature of the strip as a function of time according to a third embodiment of the method according to the invention.
Figure 6:
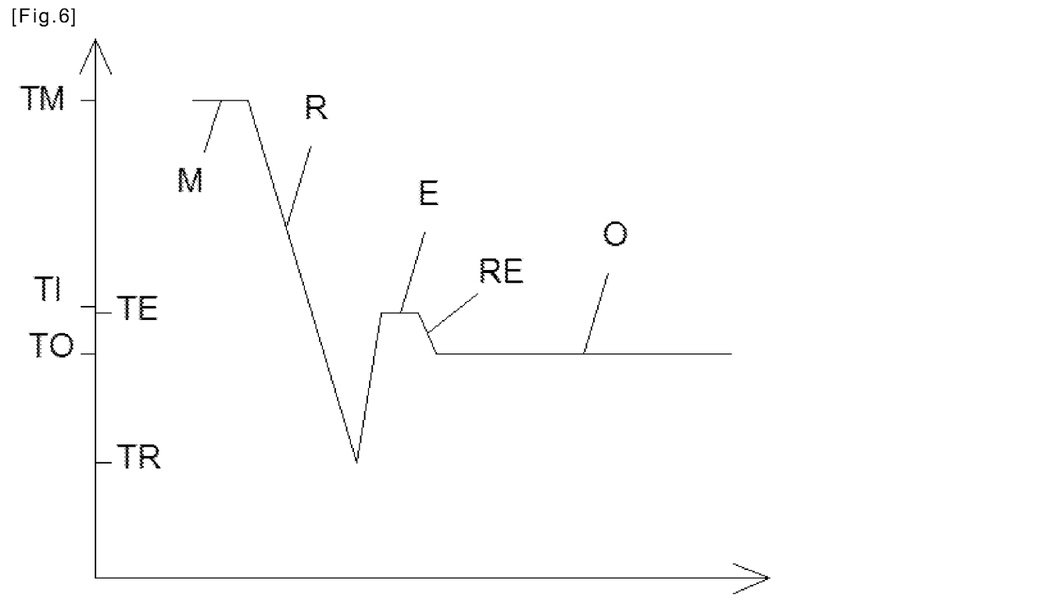
FIG. 6 is a diagram illustrating the temperature of the strip as a function of time according to a fourth embodiment of the method according to the invention.

As illustrated in FIGS. 3 and 5, when the metallurgy of the steel does not require is the strip to be cooled below the temperature necessary to initiate the chemical reactions for residue reduction, the cooling of the strip is advantageously stopped at this temperature. As illustrated in FIGS. 4 and 6 to 8, when the steel metallurgy requires the strip to be cooled below the temperature necessary to initiate the chemical reactions for residue reduction, it is first necessary to bring the strip, or the film on the surface of the strip, to this temperature. As we will see later, this rise in temperature necessary to trigger the chemical reactions can be carried out with equipment according to the state of the art or with dedicated equipment according to the invention. It can be done gradually or in stages. It can be more or less rapid depending on the type of heating applied.

In the remainder of the description of the invention, we will describe two examples of heating means for bringing the strip, or the film on the surface of the strip, to the temperature required to trigger the chemical reactions for residue reduction. Other means not described can be used.

A first heating means to bring the strip to the temperature required to trigger the chemical reactions is induction heating. It has the advantage of allowing a high power density for a rapid rise in temperature, A second heating means to bring the strip to the temperature required to trigger the chemical reactions is convection heating. It consists in blowing hydrogen, or a hydrogenated atmosphere with a hydrogen content between 5% and 100% and preferably greater than 10%, on the strip at a high temperature, for example 800° C. This solution makes it possible to quickly reach a film temperature at the surface of the strip that is sufficient to trigger the chemical reactions, without it being necessary to bring the entire thickness of the strip to this temperature. Mixing the atmosphere close to the surface of the strip also makes it possible to accelerate the chemical reactions.

As a variant, the rise to the temperature required to initiate the chemical reactions is carried out in two steps, the first for example with induction heating, the second with heating by blowing as previously described.

The blowing device can, for example, comprise nozzles, slots, tubes or perforated plates. To simplify the description of the invention, hereinafter we will only address the case of nozzles without this being in any way restrictive.

The blowing device is advantageously placed at the inlet of the overaging stage. It can nevertheless be placed at any point of the stage for which the remaining length downstream in the overaging stage allows sufficient dwell time to eliminate the residues. The blowing device can comprise several gas jets over the width of the strip and on each of the two large faces of the strip. The jets can be placed facing each other, or staggered over the width and/or length of the strip.

The pitch between two nozzles of the same row can be chosen according to the opening angle of the jet and the distance between the nozzles and the strip so as to cover the entire width of the strip while limiting the overlap between the jets. It can typically be between 50 mm and 200 mm.

Depending on the maximum travel speed of the strip, several rows of nozzles can be placed on each side of the strip. The pitch between two rows of nozzles is defined according to the maximum travel speed of the strip. It can typically be between 50 and 200 mm.

The jets may be substantially perpendicular to the strip or they are inclined at an angle that may be between 1° and 45° in the direction of flow of the strip (downstream) or in the direction opposite the travel of the strip (upstream).

Preferably, the distance from the blowing orifices to the strip is typically between 40 mm and 200 mm.

The gas supply rate of the nozzles can be controlled individually by row of nozzles, by pair of rows of nozzles (the pair comprising two rows placed substantially opposite each other on either side of the strip), or according to any other configuration.

Preferably, the gas exhaust velocity from the nozzles is between 10 m/s and 160 m/s and preferably between 80 m/s and 130 m/s.

The quantity of gas blown onto the strip can be controlled according in particular to its temperature, its hydrogen content, the travel speed of the strip and the film temperature of the strip. It can typically be between 0.5 and 15 $kg/m^2$ of strip, for example 1 and 3 $kg/m^2$ of strip for a 10% hydrogen gas, a mixing temperature of 800° C., a strip 1 m wide traveling at 100 m/min and a dwell time in the overaging stage of 30 s.

The nozzles can be supplied with a gas whose temperature is typically between 500° C. and 800° C. The hydrogen concentration in the gas blown on the strip can be linked in particular to its temperature and to its blowing speed, as well as to the temperature of the targeted film on the strip. It will be all the lower as the gas temperature and blowing speed levels are high.

The temperature of the gas blown on the strip leads to an exchange of heat therewith, mainly by convection. The blowing parameters, for example the gas temperature, can be controlled so that the heat contributed to the strip by the blown gas is limited to the amount of heat necessary to bring and/or keep the strip, or the film on the surface of the strip, to or at the desired temperature. The heating power of the heating devices at the inlet of the overaging stage, or upstream of it, is controlled so that they provide the quantity of additional heat possibly necessary to bring or keep the strip to or at the desired temperature.

The gas blown on the strip can be recirculated, with a recirculation fan whose suction is connected to the overaging stage and whose discharge is connected to the supply of the nozzles. The recirculation circuit may comprise means for controlling the temperature of the gas (heating and/or cooling) to bring the gas to the desired temperature at the discharge of the nozzles. A partial renewal of the atmosphere of the overaging stage can be carried out continuously to maintain the desired hydrogen concentration at the discharge of the nozzles. The device can also comprise at least one new gas injection point in the stage, this gas possibly having the desired hydrogen concentration at the discharge from the nozzles or a higher concentration possibly ranging up to 100% hydrogen.

The hydrogen content of the overaging stage, and/or that of the gas possibly blown onto the strip, is also chosen based on the type of steel to be treated and the quality of coating sought. The hydrogen content can be reduced depending on the amount of residual residue tolerated.

Depending on the nature and content of addition elements present in the steel to be treated, it may be necessary to add pre-oxidation, or internal selective oxidation, in one of the heating stages upstream of the cooling, as previously described.

BRIEF DESCRIPTION OF THE FIGURES

Other features and advantages of the invention will become apparent from the detailed description that follows, for the understanding of which reference is made to the appended drawings, in which.

DETAILED DESCRIPTION OF THE INVENTION

Since the embodiments described hereinafter are not limiting in nature, it is possible in particular to consider variants of the invention that comprise only a selection of the features that are described, provided that this selection of features is sufficient to confer a technical advantage or to differentiate the invention from the prior art. This selection comprises at least one preferably functional feature without structural details, or with only a portion of the structural details if this portion alone is sufficient to confer a technical advantage or to differentiate the invention from the prior art.

Throughout the remainder of the description, elements having an identical structure or similar functions will be designated using the same reference signs.

Figure 1:
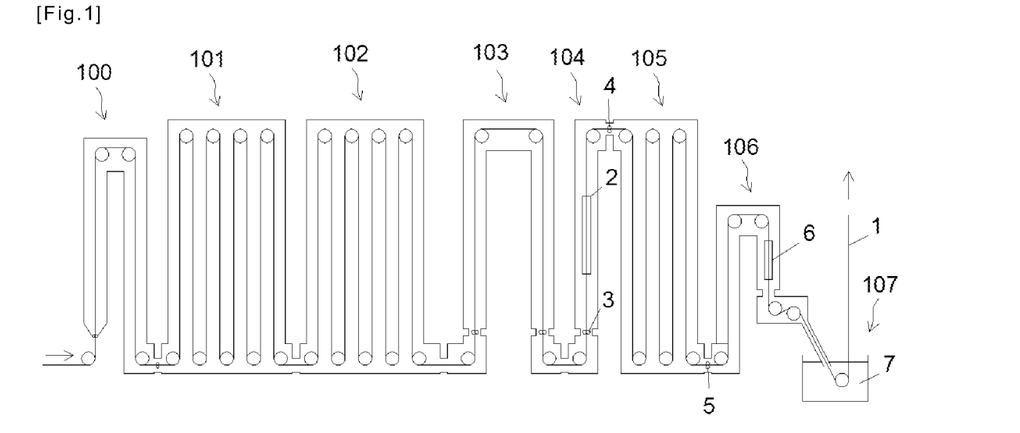
FIG. 1 is a diagrammatic and partial longitudinal view of a vertical furnace galvanization line according to one embodiment of the invention.

The diagram of FIG. 1 of the accompanying drawings schematically and partially shows, in longitudinal view, a vertical furnace galvanization line according to one embodiment of the invention, in which a metal strip 1 circulates. It comprises, successively and in the direction of travel of the strip, a direct flame preheating stage 100 in which the strip is pre-oxidized, a heating stage 101, a holding stage 102, a cooling stage 103, an induction heating stage 104, an overaging stage 105, a furnace outlet stage 106, and a dip galvanization stage 107. The cooling stage 103 comprises a slow gaseous cooling chamber followed by a rapid cooling chamber by spraying a non-is oxidizing and stripping liquid onto the strip. The induction heating stage 104 comprises an inductor 2 and means for separating atmospheres 3, 4, arranged at the inlet and at the outlet of the stage. The overaging stage comprises atmosphere separation means 4, 5, arranged at the inlet and at the outlet of said stage. These atmosphere separation means make it possible to have different atmospheres in each stage. Thus, for example, the atmosphere of the overaging stage 105 can contain 20% hydrogen whereas the atmospheres of the stages arranged upstream and downstream contain only 4%. The furnace outlet stage 106 comprises a gaseous cooling chamber in the upstroke and an inductor 6 in the downstroke. Depending on whether the overaging temperature is higher or lower than the immersion temperature of the strip in the coating bath 7, the strip is either cooled in the cooling chamber or heated by the inductor.

Figure 2:
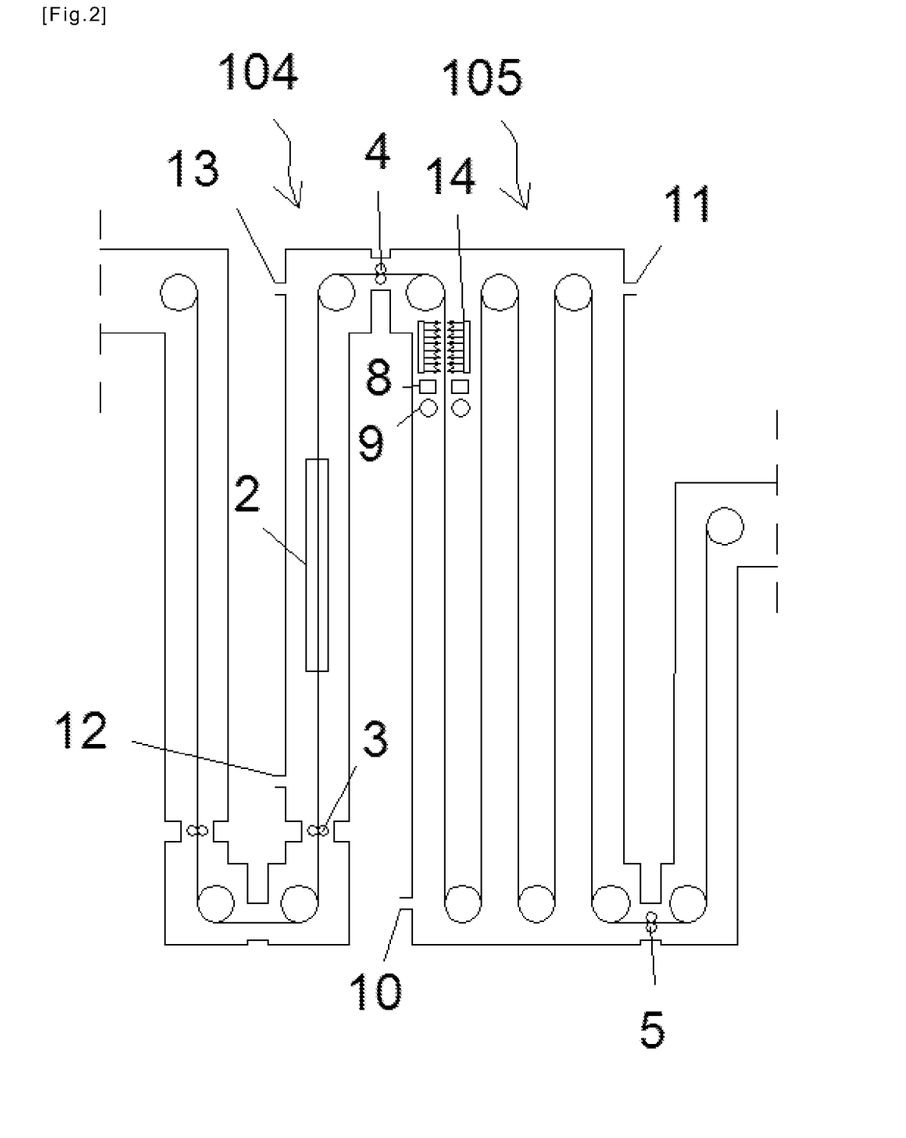
FIG. 2 is an enlargement of the induction heating stage 104 and overaging stage 105 of FIG. 1.

The diagram of FIG. 2 of the accompanying drawings schematically shows an enlargement of FIG. 1 showing the induction heating stage 104 and the overaging stage 105 in more detail. These two stages comprise injection points 10, 12 and exhaust points 11, 13 of the gas mixture forming the atmosphere of these stages. The overaging stage comprises means 8, 14 for heating the strip intended to bring the strip, or the film on the surface of the strip, to a temperature sufficient to trigger the chemical reduction reactions of the residues, in particular when the overaging temperature is not sufficient for this. The heating means 8 is for example radiative or by induction. It is chosen from among those allowing significant heat transfer to the strip over a short length. It must indeed make it possible to quickly bring the strip to the temperature necessary to trigger the chemical reactions so as to limit the dwell time of the strip at a temperature higher than the overaging temperature. The heating means 14 is convective. It consists in blowing a high-temperature gas onto the strip, for example at 800° C. The overaging stage may comprise only one of the means 8, 14 for heating the strip. If it comprises both, the heating means 8 can be placed downstream of the heating means 14, in the direction of travel of the strip, as shown in FIG. 2, or upstream thereof.

The overaging stage also comprises means 9 for cooling the strip making it is possible to quickly bring the strip back to the overaging temperature.

The diagrams of FIGS. 3 to 8 of the appended drawings diagrammatically show examples of strip temperature curves as a function of time, according to example applications of the method according to the invention. On these diagrams, the strip temperature is on the ordinate and the time is on the abscissa. For all these examples, we consider the same strip format and the same strip travel speed. The curves of these diagrams start with a plateau illustrating the end of the maintenance M, at a temperature TM, in the stage 102, followed by a liquid cooling R in the stage 103 to a temperature TR, an overaging O, at a temperature TO, in the stage 104.

In the example of FIG. 3, the steel grade and the targeted metallurgical structure do not require the strip to be cooled below the overaging temperature. Similarly, they lead to an overaging temperature TO that is sufficient to trigger the chemical reactions for residue reduction and the length of the overaging stage is such that the dwell time of the strip at the overaging temperature is sufficient to remove residue. The strip is cooled in the stage 102 to the overaging temperature TO, and it is kept at this temperature in the overaging stage 105 by the heating means of the stage, for example radiant tubes. The induction heating stage 104 is not used. The atmosphere of the overaging stage comprises a hydrogen content adapted to this steel and to the operating conditions. It is for example 10% for 4% in the upstream 104 and downstream 106 stages.

In the example of FIG. 4, the steel grade and the targeted metallurgical structure require the strip to be cooled to a temperature TR lower than the overaging temperature. The overaging temperature TO is still sufficient to trigger the chemical reactions for residue reduction and the length of the overaging stage is such that the in dwell time of the strip at the overaging temperature makes it possible to eliminate the residues. The strip is cooled in the stage 102 to the temperature TR. The inductor of the heating stage 104 makes it possible to raise the temperature of the strip to the overaging temperature TO, and it is kept at this temperature in the overaging stage 105 by the heating means of the stage.

In the example of FIG. 5, the steel grade and the targeted metallurgical structure lead to an insufficient overaging temperature to initiate the chemical reactions for residue reduction. However, they do not require the strip to be cooled below this temperature TE necessary to initiate the chemical reactions. The strip is cooled in the stage 102 to the temperature TE, for example 400° C. The induction heating stage 104 is not used. The plateau E at the temperature TE is limited to the time necessary to trigger the chemical reactions, for example one minute. Depending on the travel speed of the strip, this plateau can be obtained during the passage of the strip in the induction heating stage 104, the thermal insulation of which prevents the cooling of the strip. If the dwell time of the strip in the induction heating stage is not sufficient, the plateau E ends at the start of the overaging stage. Cooling RE is then carried out to bring the strip to the overaging temperature TO. Depending in particular on the format of the strip, its travel speed and the temperature difference between TE and TO, the cooling can be obtained simply by controlling, in particular stopping, the heating equipment arranged at the inlet of the overaging stage. If this is not sufficient, a cooling means 9 makes it possible to cool the strip to the temperature TO. This means consists, for example, in blowing a gas at an appropriate temperature onto the strip. The strip is then kept at the overaging temperature by the heating means of the stage, In the example of FIG. 6, the steel grade and the targeted metallurgical structure lead to an overaging temperature that is still insufficient to initiate the chemical reduction reactions. In addition, they require the strip to be cooled below the temperature TE necessary to initiate the chemical reactions. The strip is thus cooled in the stage 102 down to the temperature TR. The induction heating stage 104 is used to heat the strip to the temperature TE. Again, the plateau E at the temperature TE is limited to the time necessary to initiate the chemical reactions.

Figure 7:
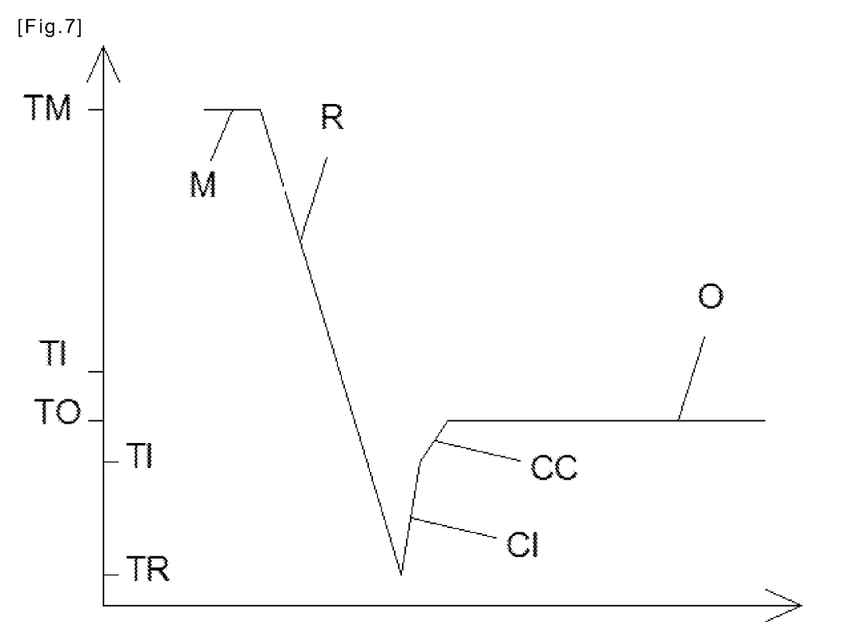
FIG. 7 is a diagram illustrating the temperature of the strip as a function of time according to a fifth embodiment of the method according to the invention.

In the example of FIG. 7, the steel grade and the targeted metallurgical structure require the strip to be cooled below the overaging temperature TO. In addition, they lead to an insufficient overaging temperature to trigger the chemical reduction reactions when this temperature TO is reached by the induction heating of the stage 104. The strip is cooled in the stage 102 to the temperature TR. The inductor of the heating stage 104 makes it possible to raise the temperature of the strip to a temperature TI, lower than the overaging temperature TO. After this first heating CI, a second heating CC makes it possible to bring the strip to the overaging temperature. This CC heating is carried out by blowing a hot gas on the strip, for example at 800° C., by the means 14 visible in FIG. 2. It leads to a film temperature at the surface of the strip at least equal to the temperature TE necessary to initiate the chemical reactions for residue reduction, while the core of the strip can remain at a lower temperature. It is thus not necessary to bring the strip to a temperature higher than the overaging temperature to initiate these reactions.

Figure 8:
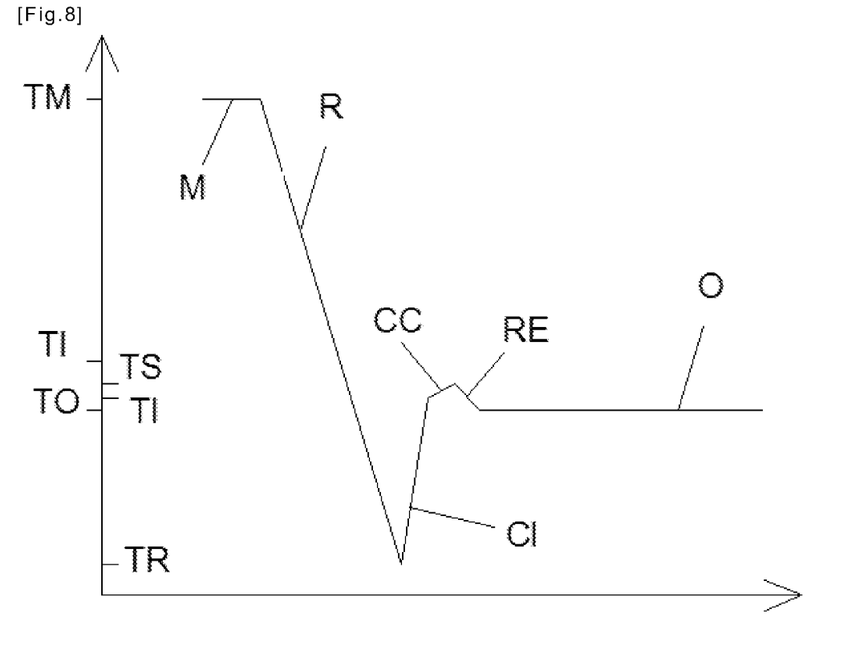
FIG. 8 is a diagram illustrating the temperature of the strip as a function of time according to a sixth embodiment of the method according to the invention.

The example of FIG. 8 is close to that of FIG. 7. It differs from the latter in that the overaging temperature TO is significantly lower. The second heating CC is also achieved by blowing hot gas onto the strip through the means 14. It leads to a film temperature at the surface of the strip at least equal to the temperature TE necessary to initiate the chemical reactions for residue reduction, while the core of the strip only reaches a temperature TS lower than TE, but here this is greater than the overaging temperature TO. As in the example of FIG. 5, cooling RE is then carried out to bring the strip to the overaging temperature.

Figure 9:
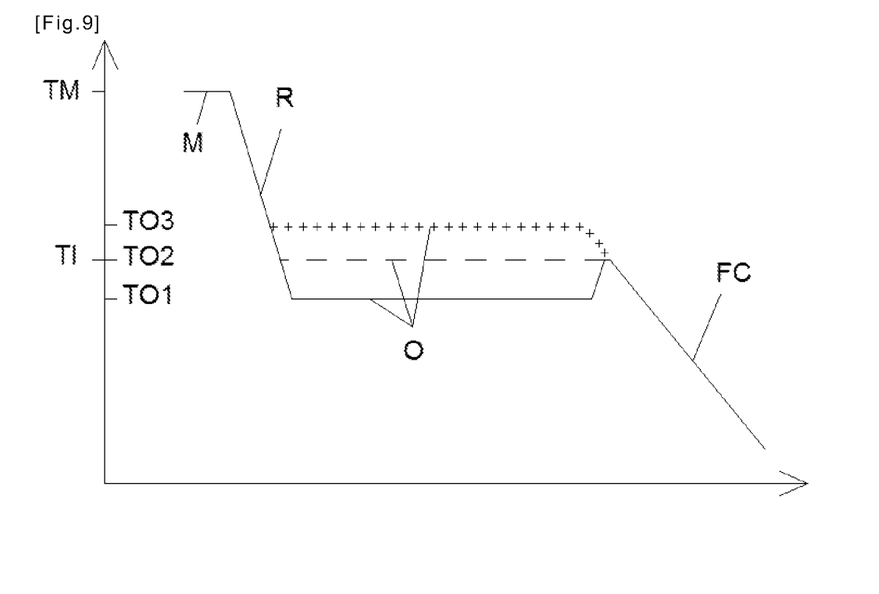
FIG. 9 is a diagram illustrating, for a galvanization line, the temperature of the strip as a function of time for 3 different overaging temperatures according to the first embodiment of the method according to the invention illustrated in FIG. 3.

FIG. 9 illustrates three examples of thermal cycles according to the overaging temperature for a galvanization line. The first example shown in solid lines corresponds to the case of FIG. 3, namely that the overaging temperature T01 is lower than the temperature TI at which the strip must be immersed in the coating bath. The strip is heated from T01 to TI in the furnace outlet stage 106 by means of the inductor 6. For in these 3 examples, after leaving the bath, cooling FC brings the strip to ambient temperature. The second example shown in broken lines corresponds to the case where the overaging temperature T02 is equal to the temperature TI at which the strip must be immersed in the coating bath. The strip simply passes through the furnace outlet stage 106 without being heated or cooled. The third example shown by a is succession of crosses corresponds to the case where the overaging temperature T03 is higher than the temperature TI at which the strip must be immersed in the coating bath. The strip is cooled from T03 to TI in the furnace outlet stage 106. This cooling is carried out by blowing a gas onto the strip, for example a mixture of nitrogen and hydrogen.

As will be readily understood, the invention is not limited to the examples that have just been described, and numerous modifications may be made to these examples without departing from the scope of the invention. In addition, the various features, forms, variants, and embodiments of the invention may be grouped together in various combinations as long as they are not incompatible or mutually exclusive.

The invention claimed is:

1. A method for removing residues present on a metal strip at the outlet of a cooling stage of a continuous line, the residues being formed during a cooling of said metal strip by a non-oxidizing liquid solution for the metal strip and a stripping liquid solution for the oxides present on the surface of the strip, or by a mixture of this liquid solution and a gas, characterized in that the method comprises a step of reducing the residues by hydrogen;
   wherein the hydrogen or hydrogenated atmosphere blown onto the metal strip has a temperature of between 500° C. and 800° C.

2. The method according to claim 1, wherein the residue reduction step lasts between 15 seconds and 300 seconds for a strip temperature between 50° C. and 600° C.

3. The method according to claim 1, wherein the residue reduction step is carried out while the metal strip is in an atmosphere whose hydrogen content is between 5% and 100% by volume.

4. The method according to claim 1, wherein, for the residue reduction step, hydrogen, or a hydrogenated atmosphere whose hydrogen content is greater than or equal to 10% by volume, and is blown onto the metal strip.

5. The method according to claim 1, wherein the blowing speed of the hydrogen, or of the hydrogenated atmosphere, is between 10 m/s and 160 m/s in contact with the metal strip.

6. The method according to claim 1, further comprising a step of pre-oxidation, or internal selective oxidation, of the surface of the strip carried out in a preheating, heating or holding at temperature step of the metal strip, arranged before the cooling stage.

7. The method according to claim 1, implemented on a continuous line comprising a stage for dip coating the metal strip in a molten bath, further comprising, after the residue reduction step, a step of heating or cooling the metal strip to a temperature close to the temperature of the bath.

* * * * *